United States Patent
Beil et al.

(10) Patent No.: US 8,403,553 B2
(45) Date of Patent: Mar. 26, 2013

(54) METHOD FOR THE PRODUCTION OF AN ILLUMINATION DEVICE AND ILLUMINATION DEVICE

(75) Inventors: Jürgen Beil, Parsberg (DE); Wolfgang Lex, Barbing (DE); Andreas Stich, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 834 days.

(21) Appl. No.: 10/551,570

(22) PCT Filed: Mar. 31, 2004

(86) PCT No.: PCT/DE2004/000670
§ 371 (c)(1),
(2), (4) Date: Apr. 13, 2006

(87) PCT Pub. No.: WO2004/088372
PCT Pub. Date: Oct. 14, 2004

(65) Prior Publication Data
US 2006/0245213 A1    Nov. 2, 2006

(30) Foreign Application Priority Data

Mar. 31, 2003 (DE) .................................. 103 14 525

(51) Int. Cl.
*F21V 7/04* (2006.01)
*F21V 8/00* (2006.01)
(52) U.S. Cl. .......................... 362/616; 362/628; 362/612
(58) Field of Classification Search .................. 362/616, 362/600, 606–608, 610, 612, 619, 613, 622, 362/623, 628, 555, 556, 561, 800, 26, 27, 362/97, 240, 312, 604, 33, 125, 151, 153; 345/1.3, 2.2, 3.2, 55; 349/62, 65; 385/129
See application file for complete search history.

(56) References Cited

U.S. PATENT DOCUMENTS

| 1,539,738 | A | * | 5/1925 | Hutton ....................... 273/153 S |
| 5,592,183 | A | | 1/1997 | Chen |
| 5,592,193 | A | | 1/1997 | Chen |
| 6,036,328 | A | * | 3/2000 | Ohtsuki et al. ................ 362/612 |
| 6,241,258 | B1 | | 6/2001 | Higuchi et al. |
| 6,241,358 | B1 | * | 6/2001 | Higuchi et al. ............... 362/613 |
| 6,464,367 | B2 | * | 10/2002 | Ito et al. ....................... 362/613 |

(Continued)

FOREIGN PATENT DOCUMENTS
GB   2 376 287 A   12/2002
JP   64-29708      2/1989

(Continued)

*Primary Examiner* — Thomas Sember
(74) *Attorney, Agent, or Firm* — Cozen O'Connor

(57) ABSTRACT

The luminous area of a lighting apparatus 10, 110, 210 with a rectangular luminous area is made up in modular fashion from individual rectangular luminous modules 1. The basic set comprises a first luminous module 11 of a first size, a second luminous module 21 of a second size, a third luminous module 31, whose length corresponds to the length of the first luminous module 11 and whose width corresponds to the width of the second luminous module 21, and a fourth luminous module 41, whose length corresponds to the width of the first luminous module 11 and whose width corresponds to the length of the second luminous module 21. By combining the luminous modules it is possible to produce backlighting for a multiplicity of display sizes.

14 Claims, 3 Drawing Sheets

U.S. PATENT DOCUMENTS

| | | | |
|---|---|---|---|
| 6,580,477 B1 * | 6/2003 | Cho | 349/65 |
| 7,091,926 B2 * | 8/2006 | Kulas | 345/1.1 |
| 2001/0004317 A1 | 6/2001 | Reithmeier | |
| 2001/0053072 A1 * | 12/2001 | Takemoto | 362/31 |
| 2003/0156074 A1 * | 8/2003 | Ranganathan et al. | 345/1.1 |
| 2003/0231277 A1 * | 12/2003 | Zhang | 349/187 |

FOREIGN PATENT DOCUMENTS

| | | |
|---|---|---|
| JP | 02-247687 | 10/1990 |
| JP | 11-203925 | 7/1999 |
| JP | 11-288611 | 10/1999 |
| WO | WO 02/42809 A1 | 5/2002 |

* cited by examiner

METHOD FOR THE PRODUCTION OF AN ILLUMINATION DEVICE AND ILLUMINATION DEVICE

RELATED APPLICATIONS

This is a U.S. national stage of application No. PCT/DE2004/000670, filed on Mar. 31, 2004.

This patent application claims the priority of German patent application 103 14 525.7 filed Mar. 31, 2003, the disclosure content of which is hereby incorporated by reference.

FIELD OF THE INVENTION

The invention relates to a method for producing a lighting apparatus with a polygonal luminous area, particularly a backlighting apparatus for a display.

BACKGROUND OF THE INVENTION

Displays, for example for monitors, need to be backlit when using liquid crystal displays, which themselves do not light up. This is normally done using cold cathode lamps or, within the realms of miniaturization and the production of flat screens, two-dimensional optical light guides. Two-dimensional optical light guides as luminous areas are usually made of glass and are supplied with light, for example by light emitting diodes (LEDs), at the side areas. Particularly from display and hence luminous area sizes having a screen diagonal with a length of 17", the problem arises that homogeneous illumination of the entire area is not or barely possible. Particularly in the center of the display, the illumination is weaker than in the rest of the screen. In addition, with conventional production facilities for lighting apparatus, it is a complex matter to produce lighting apparatus in different sizes. The production of two-dimensional lighting apparatus is a further difficulty as size increases.

SUMMARY OF THE INVENTION

One object of the invention is to provide a lighting apparatus which overcomes the cited drawbacks of the prior art.

Another object of the invention is to provide a lighting apparatus which can be used to illuminate screens with a screen diagonal of over 17" very homogeneously.

Another object of the present invention is to provide a method that can be used to produce lighting apparatus of different sizes flexibly.

A further object of the present invention is to facilitate production of large-area lighting apparatus.

These and other objects are attained in accordance with one aspect of the present invention directed to a method for producing a lighting apparatus that involves a polygonal luminous area, particularly a backlighting apparatus for a display. The luminous area is put together in modular fashion from a plurality of individual polygonal luminous modules.

By combining a plurality of luminous modules of the same or different size it is possible to produce backlighting for a multiplicity of display sizes.

One approach for producing a lighting apparatus involves a rectangular luminous area being put together in modular fashion from a plurality of individual rectangular luminous modules.

In one preferred variant, the luminous modules are selected from a basic set of different-sized, preferably rectangular luminous modules. Such a basic set contains, so to speak, a basic kit containing luminous modules in a limited number of different sizes. This allows a multiplicity of different-sized lighting apparatus to be put together using luminous modules from the same basic set. This simplifies flexible production at low cost.

If a nonrectangular luminous area needs to be created, it is naturally also possible to choose luminous modules with a different geometry, for example luminous modules in the form of a non-orthogonal parallelogram. This special form of luminous modules could be used to backlight a display in the form of a non-orthogonal parallelogram, for example.

In one particularly preferred variant of the method, at least some of the plurality of luminous modules has a light input part with light emitting diodes (LEDs). In contrast to a conventional lighting apparatus comprising a single electroluminous panel, the invention can be used to achieve a more homogeneous distribution of the power loss and hence of the resultant heat over the entire lighting apparatus, since the LEDs are arranged not only at the edge of the luminous area but also within the luminous area at the junction between individual luminous modules. The light input part is in a form such that the light beams pass through a certain section within the light input part before entering the luminous module, whose top side is bounded by the light exit area. In this case, the light input part's area is not part of the light exit area, whose size is denoted by the length of its diagonal in the case of the first and second luminous modules.

Other, preferably rod-like light sources, for example cold cathode lamps such as CCFLs (Cold Cathode Fluorescent Lamp) or neon tubes, may also be provided in the light input part within the context of the invention. Furthermore, it is also possible to use organic light sources such as OLEDs or electroluminescent films in this case.

In one preferred variant of the method, the basic set comprises a first luminous module of a first size, a second luminous module of a second size, a third luminous module, whose length corresponds to the length of the first luminous module (11) and whose width corresponds to the width of the second luminous module (21), and a fourth luminous module, whose length corresponds to the width of the first luminous module (11) and whose width corresponds to the length of the second luminous module (21).

In one particularly preferred variant of the method for producing a lighting apparatus with a rectangular luminous area, the basic set of luminous modules comprises four different-sized luminous modules, where the length of the diagonal of a first luminous module is an integer multiple of one inch and the ratio of length to width of the luminous module is preferably 4:3, the length of the diagonal of a second luminous module, which is smaller than the first luminous module, is an integer multiple of one inch and the ratio of length to width of the luminous module is preferably 4:3, the length of a third luminous module corresponds to the length of the first luminous module and the width of the third luminous module corresponds to the width of the second luminous module, and the length of a fourth luminous module corresponds to the width of the first luminous module and the width of the fourth luminous module corresponds to the length of the second luminous module.

It is thus possible to produce a rectangular luminous area whose diagonal has an integer length measured in inches by arranging one or more first and/or second luminous modules, which themselves have a diagonal whose length has an integer length in inches, along the luminous area diagonal, with the two luminous modules touching at the corners. The remaining area of the rectangular luminous area is filled with other luminous modules selected from the set of first, second, third and fourth luminous modules. A very small kit-like set of just four luminous modules can thus be used to produce a multiplicity of lighting apparatus with different-sized luminous areas.

In one particularly preferred variant of the method, the length of the diagonal of the first luminous module is 7" and the length of the diagonal of the second luminous module is 5". These two luminous modules and the resultant third and fourth luminous modules can be used to produce lighting apparatus which are suitable for backlighting all current monitor sizes. In this preferred variant, the third luminous module has length and width dimensions of 5.6"×3" and the fourth luminous module has length and width dimensions of 4.2"×4". In particular, this basic set can be used to produce lighting apparatus for monitors with a screen diagonal of 15, 17 and 19".

However, lighting modules of other sizes may, of course, also be used as the basic set, for example a first lighting module and a second lighting module which have the diagonal lengths 3" and 4". 4" and 5" or 3" and 5" are other possible combinations. However, since the aim is to achieve the highest possible level of mechanical robustness for the entire luminous area while simultaneously reducing production complexity, it is advantageous if the individual luminous modules are not chosen to be too small. If a basic set of luminous modules whose first or second luminous module has a diagonal length which is greater than 7" or 5" is used then it is true that the mechanical robustness of the entire luminous area increases and the production complexity decreases, particularly in the case of very large luminous area sizes. However, the number of possible, different-sized luminous areas which can be put together from such a basic set within the context of the available display sizes decreases. For special applications, it is also possible to imagine such luminous module sizes.

In one particularly preferred variant of the method, all of the luminous modules have a light input part with light emitting diodes. This has the advantage that a very homogeneous light emitting luminous area is attained without any great additional production complexity, primarily by joining together the individual luminous modules.

In one preferred method, more or less all of the external areas of the luminous modules through which light is not intended to pass during operation are provided with a reflective coating. The coating thus covers, in particular, the base area, the side areas and the part of the surface of the light input part on which no LEDs are fitted. The light exit area and the light entry area between the LEDs and the light input part are not coated In one particularly preferred variant of the inventive method, a luminous body of the luminous modules is provided whose cross section tapers as the distance from the light input part increases. The effect achieved by the light exit area and the base area of the luminous modules converging toward the end region is that the light supplied in the light input part by the LEDs largely does not pass through the luminous module to the end region without emerging from the luminous module on account of total reflection. Instead, the tapering shape of the luminous module contributes to the light produced in the LEDs emerging almost totally homogeneously on the entire light exit area of the luminous modules.

In one particularly preferred variant of the inventive method, the individual luminous body are in a form such that the thickness of the luminous body next to the light input part is greater than the thickness of the light input part. As a result, a step is produced between the light input part and the light exit area of the luminous module and can have an adjacent luminous module engage in it, so that the luminous modules can overlap, when put together to form a luminous area, such that light input parts which are situated below the luminous area are covered. The effect achieved by this is that the total area of the rectangular luminous area of the lighting apparatus actually corresponds to the sum of the areas of the individual luminous modules, and the luminous area formed by the light exit areas of the individual luminous modules is largely planar.

In one preferred variant of the method, a luminous module has a base area, which is opposite the light exit area, and a reflective structure, which directs light emitted by the LEDs during operation into the region of the step. This achieves sufficient illumination in the region of the step in a simple manner.

Another aspect of the present invention is directed to a lighting apparatus with a polygonal luminous area, particularly a backlighting apparatus for a display. The luminous area is made up in modular fashion from individual polygonal luminous modules.

A lighting apparatus based on an embodiment of the invention is made up from a plurality of individual luminous modules comprising a complete basic set or from a single type of luminous modules. The luminous modules need to be put together such that a rectangular luminous area with a length-to-width ratio of 4:3 and an integer diagonal measured in inches is obtained.

DETAILED DESCRIPTION OF THE DRAWINGS.

Figure 1:
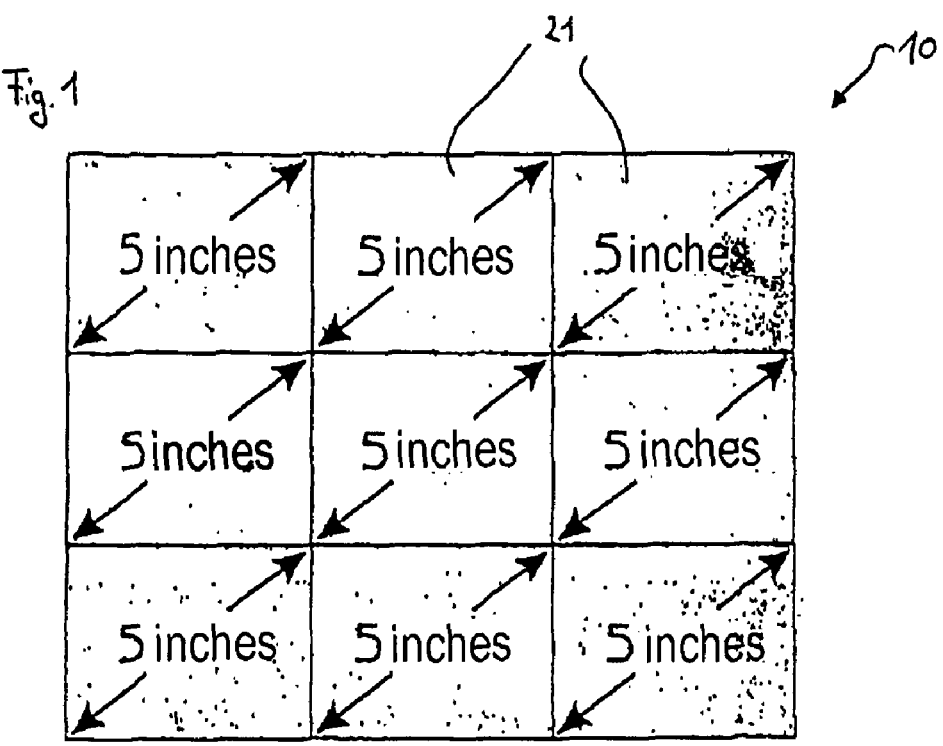
FIG. 1 shows a schematic illustration of a plan view of a first lighting apparatus.

Exemplary Embodiment 1 (FIG. 1):

This is a lighting apparatus 10 which has a plurality of luminous modules 1 with a diagonal length of 5". By putting together 3×3 luminous modules 21 of this size, the result is a lighting apparatus 10 which has a diagonal length of 15". With a conventional electroluminescent panel of this size, it is difficult to achieve homogeneous illumination in the center of the luminous area. The effect achieved by using a plurality of individual smaller luminous modules 1 is that very homogeneous illumination is produced on the entire area of the rectangular luminous area. In this exemplary embodiment, a single type 21 of luminous modules from the set comprising 5", 7" and associated third and fourth luminous modules has been selected from a basic set of luminous modules.

Using a basic set containing 3" and 4" luminous modules as first and second luminous modules, the same lighting apparatus would be attained by putting together five times five 3" modules.

The same number of rows and columns in a luminous area means that when using luminous modules with a length-towidth ratio of 4:3 and an integer diagonal measured in inches there is always a rectangular luminous area with a length-to-width ratio of 4:3 and an integer diagonal measured in inches.

Exemplary Embodiment 2 (FIG. 2):

This is a lighting apparatus 110 whose luminous area is made up of four different-sized luminous modules 11, 21, 31, 41. In this Figure, it is also possible to see how a basic set is defined. Two luminous modules 11, 21, whose light exit area has a diagonal length of 7" or 5" for a length-to-width ratio of 4:3, touch at one corner such that they can be inscribed in a rectangle with the diagonal length 12". The two remaining rectangles 31, 41 for complementing the 12" rectangle are obtained such that the length of the third luminous module 31 corresponds to the length of the first luminous module 11 and the width of the third luminous module 31 corresponds to the width of the second luminous module 21, and the length of the fourth luminous module 41 corresponds to the width of the first luminous module 11 and the width of the fourth luminous module 41 corresponds to the length of the second luminous module 21. The dimensions 5.6"×3" and 4.2"×4" are thus obtained for the third and fourth luminous modules.

Figure 2:
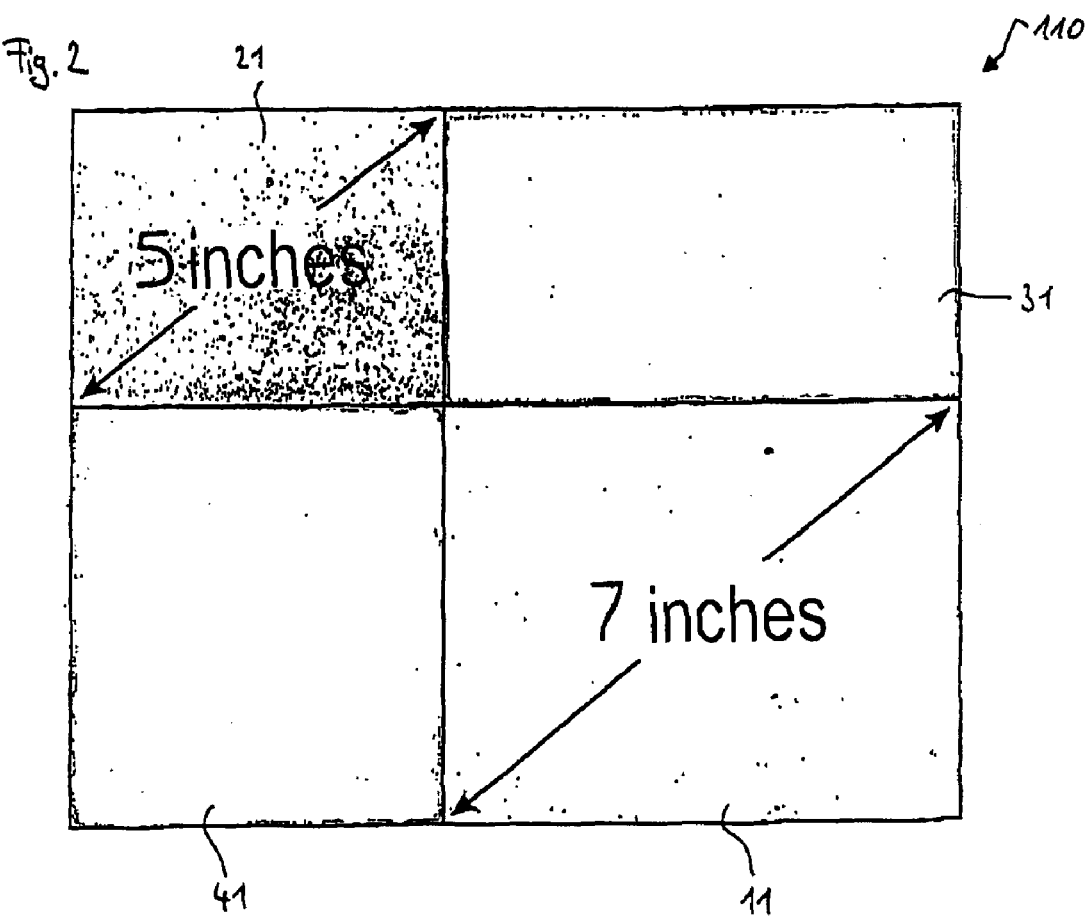
FIG. 2 shows a schematic illustration of a plan view of a second lighting apparatus.
Figure 3:
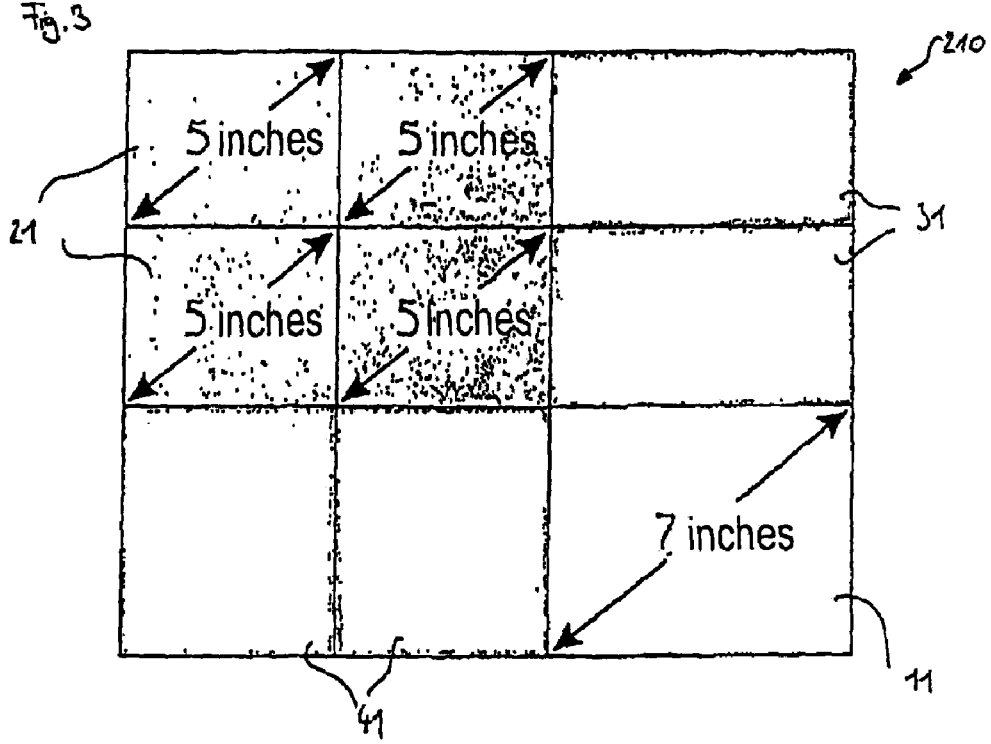
FIG. 3 shows a schematic illustration of a plan view of a third lighting apparatus.

Exemplary Embodiment 3 (FIG. 3):

This is a lighting apparatus 210 whose luminous area is made up of 9 luminous modules containing four different-sized luminous modules. The same basic set as can be seen in FIG. 2 and containing just four different luminous modules 11, 21, 31, 41 is sufficient in order to put together such a luminous area. The diagonal length of 17" obtained corresponds to commercially available screen sizes. The basic set used here can be used to put together luminous areas with diagonal lengths of 10", 14", 15", 19", 20", 21" and 22", for example. From a diagonal length of 24" upwards, all integer lengths measured in inches are possible.

Exemplary Embodiment 4 (FIG. 4):

This is a luminous module 1 which can be produced in various sizes and which is equipped with LEDs which input light into the luminous module 1 at an end face of the light input part 3.

The tapering cross section of the luminous body 9 ensures that light emerges over the entire light exit area because the light from the LEDs impinges on the backside of the luminous body which is at an angle to the front side. As a result, the light is bent to the front side homogeneously over the width of the lighting apparatus.

All of the areas through which, in contrast to the light exit area 6 and the light entry area 16 between the LEDs and the light input part light, no light has to pass during operation are preferably provided with a reflective coating 13 which prevent crosstalk between the luminous modules via side faces and reduce losses.

A reflective structure 5 on the base area 4 between the light input part 3 and the luminous body 9 helps light to pass directly behind the step 4 to the light exit area through reflection. The reflective structure may be in rippled form, for example. Any other structure which helps to avoid weaker illumination of the luminous body in the region of the step is also suitable, however.

Figure 4:
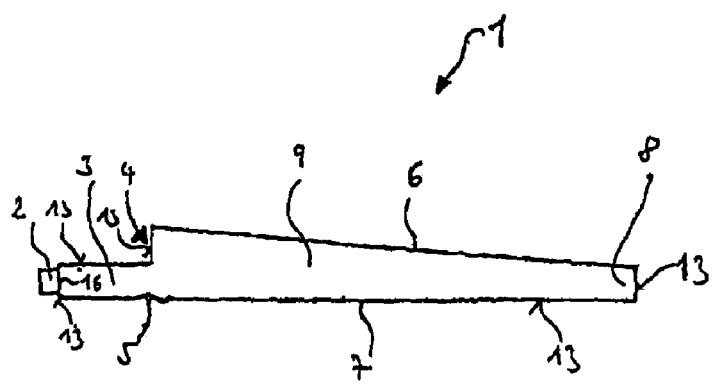
FIG. 4 shows a schematic illustration of a cross section through a first luminous module.

FIG. 4 shows that the end region 8 of the luminous module has the same thickness as the height of the step 4. This ensures a planar luminous area after a plurality of individual luminous modules has been joined together, as can be seen by way of example in FIGS. 1 to 3.

Figure 5:
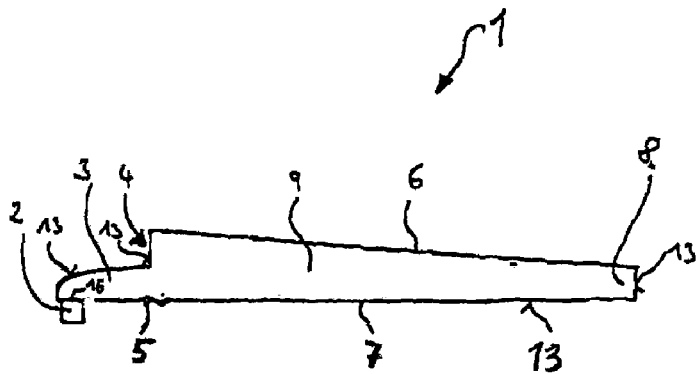
FIG. 5 shows a schematic illustration of a cross section through a further luminous module.

Exemplary Embodiment 5 (FIG. 5):

This is a further luminous module 1. A fundamental difference from the luminous module which is described in exemplary embodiment 4 is that the light is input into the light input part 3 via the base area 7 of the luminous module. To get the light to be input into the entire luminous module, the light input part 3 is in a form such that the side which is opposite the LEDs has the shape of a parabola. The light emitted by the LEDs 2 is deflected on this parabolic side into the luminous body 9 of the luminous module 1. The step 4 and the end region 8 of the luminous module are again of such a height or thickness that individual luminous modules 1, 11, 21, 31, 41 can be joined together such that the result is a planar surface for the luminous area of the lighting apparatus.

Figure 6:
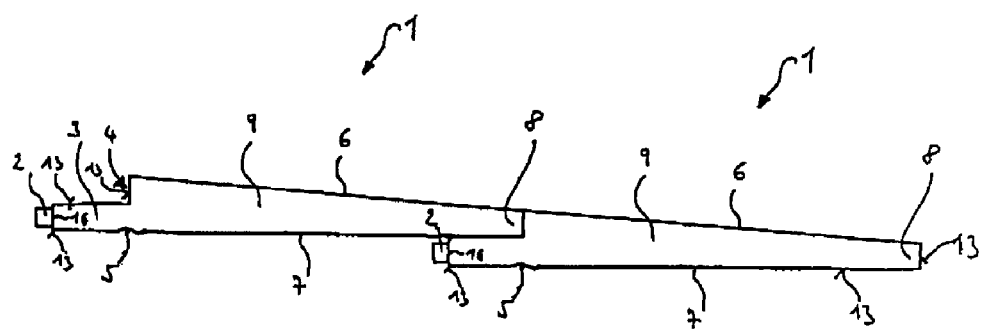
FIG. 6 shows a schematic illustration of a cross section through two joined luminous modules.

Exemplary Embodiment 6 (FIG. 6):

This shows an example of how two luminous modules (1) overlap, when put together to form a luminous area, such that the light input part 3 is covered by the adjacent luminous module. The result is a largely planar luminous area.

The invention is not limited by the description with reference to the exemplary embodiments. Rather, the invention covers any new feature and any combination of features, which includes any combination of features in the patent claims, in particular, even if this feature or this combination itself is not explicitly indicated in the patent claims or exemplary embodiments.

The invention also extends to all methods and lighting apparatus which have the basic features of the invention. In particular, it may be used for lighting apparatus which are not based on the standard of an area diagonal which has an integer length measured in inches. Other standards for illuminated objects, such as monitors, which are prescribed by the market may require different dimensions for luminous areas, and hence for individual luminous modules. The basic concept of the invention, to use a kit-like basic set of luminous modules, is not changed at all by this. In addition, it is possible to use completely different geometries than rectangles for the luminous modules. In particular, triangles and hexagons are suitable for this. Such basic sets can be used to produce a whole series of luminous area shapes and sizes.

It is also possible to use a multiplicity of different LEDs which input light into the individual luminous modules. It is also possible to combine various brightnesses and colors of individual LEDs. All reflective materials, e.g. the conventional reflective materials, and different materials may be used for the luminous bodies.

Finally, it is advantageous, but not absolutely necessary, within the context of the invention to use LEDs as light sources. Instead of LEDs, it is also possible to provide other light sources, preferably the aforementioned light sources such as cold cathode lamps in the form of CCFLs or neon tubes, OLEDs or electroluminescent films.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

The invention claimed is:

1. A method for producing a display comprising a backlighting apparatus, the backlighting apparatus having a polygonal luminous area which corresponds to a size of the display, the method comprising:
   assembling the polygonal luminous area of the backlighting apparatus in a modular manner from a plurality of individual polygonal luminous modules; and
   selecting the individual polygonal luminous modules from a basic set of different-sized luminous modules;
   wherein the basic set of different-sized luminous modules comprises:
   a first luminous module having a first size,
   a second luminous module having a second size, a third luminous module having a length that corresponds to the length of the first luminous module and a width that corresponds to the width of the second luminous module, and a fourth luminous module having a length that corresponds to the width of the first luminous module and a width that corresponds to the length of the second luminous module, wherein each of said plural individual luminous modules has a light input part with light emitting diodes, wherein each of said plural individual luminous modules has a light exit area comprising a region of a step, wherein a base area opposite the light exit area has a reflective structure embodied as a rippled form which directs light emitted by the light emitting diodes during operation into the region of the step.

2. The method as claimed in claim 1, wherein the polygonal luminous area is rectangular and is modularly assembled from a plurality of individual rectangular luminous modules.

3. The method as claimed in claim 1, wherein the basic set of different-sized luminous modules comprises four different-sized luminous modules, wherein a length of a diagonal of the first luminous module is an integer multiple of 1 inch and a ratio of length to width of the first luminous module is preferably 4:3, the length of the diagonal of the second luminous module, which is smaller than the diagonal length of the first luminous module, is an integer multiple of 1 inch and the ratio of length to width of the second luminous module is preferably 4:3, the length of a third luminous module corresponds to the length of the first luminous module and the width of the third luminous module corresponds to the width of the second luminous module, and the length of a fourth luminous module corresponds to the width of the first luminous module and the width of the fourth luminous module corresponds to the length of the second luminous module.

4. The method as claimed in claim 3, wherein the length of the diagonal of the first luminous module is 7 inches and the length of the diagonal of the second luminous module is 5 inches.

5. The method as claimed in claim 1, wherein external areas of each of said plural individual luminous modules, which are not one of a light exit area and a light entry area, are at least partly provided with a reflective coating.

6. The method as claimed in claim 1, wherein a luminous body of each of said plural individual polygonal luminous modules is provided whose cross section tapers as a distance from the light input part increases.

7. The method as claimed in claim 6, wherein a thickness of the luminous body next to the light input part is greater than the thickness of the light input part, and the step located between the light input part and the light exit area is in a form such that each of said plural individual polygonal luminous modules overlap, when assembled to form the polygonal luminous area, such that the light input part is covered by an adjacent luminous module.

8. A display comprising a backlighting apparatus, the backlighting apparatus having a polygonal luminous area, wherein the polygonal luminous area corresponds to a size of the display, wherein the polygonal luminous area comprises:

a plurality of individual polygonal luminous modules arranged in modular manner in the polygonal luminous area of the backlighting apparatus;

wherein the individual polygonal luminous modules are selected from a basic set of different-sized luminous modules;

wherein the basic set of different-sized luminous modules comprises:

a first luminous module having a first size, a second luminous module having a second size, a third luminous module having a length that corresponds to the length of the first luminous module and a width that corresponds to the width of the second luminous module, and a fourth luminous module having a length that corresponds to the width of the first luminous module and a width that corresponds to the length of the second luminous module; and wherein the luminous area comprises one of each of said luminous modules of the basic set of different-sized luminous modules or at least two pairs of luminous modules each having two different-sized luminous modules in the basic set of different-sized luminous modules, wherein each of said plural individual luminous modules has a light input part with light emitting diodes, wherein each of said plural individual luminous modules has a light exit area comprising a region of a step, and wherein a base area opposite the light exit area has a reflective structure embodied as a rippled form.

9. The display as claimed in claim 8, wherein the polygonal luminous area is rectangular and comprises individual rectangular luminous modules.

10. The display as claimed in claim 8, wherein the basic set of different-sized luminous modules comprises four different-sized luminous modules, wherein a length of a diagonal of the first luminous module is an integer multiple of 1 inch and a ratio of length to width of the first luminous module is preferably 4:3, the length of the diagonal of the second luminous module, which is smaller than the diagonal length of the first luminous module, is an integer multiple of 1 inch and the ratio of length to width of the second luminous module is preferably 4:3, the length of the third luminous module corresponds to the length of the first luminous module and the width of the third luminous module corresponds to the width of the second luminous module, and wherein the length of the fourth luminous module corresponds to the width of the first luminous module and the width of the fourth luminous module corresponds to the length of the second luminous module.

11. The display as claimed in claim 10, wherein the length of the diagonal of the first luminous module is 7 inches and the length of the diagonal of the second luminous module is 5 inches.

12. The display as claimed in claim 8, wherein external areas of each of said plural individual polygonal luminous modules, which are not one of a light exit area and a light entry area, are at least partly provided with a reflective coating.

13. The display as claimed in claim 8, wherein a luminous body of each of said plural individual polygonal luminous modules is provided whose cross section tapers as a distance from the light input part increases.

14. The display as claimed in claim 8, wherein a thickness of the luminous body next to the light input part is greater than the thickness of the light input part, with the step being in a form such that each of said plural individual polygonal luminous modules, when assembled form the polygonal luminous area, such that the light input part is covered by an adjacent luminous module.

* * * * *